United States Patent
Barber (12)

(10) Patent No.: US 6,187,885 B1
(45) Date of Patent: Feb. 13, 2001

(54) COPOLYMERS OF VINYLIDENE FLUORIDE AND HEXAFLUOROPROPYLENE AND PROCESS FOR PREPARING THE SAME

(75) Inventor: Leonard Aloysius Barber, Warminster, PA (US)

(73) Assignee: Atofina Chemicals, Inc., Philadelphia, PA (US)

( * ) Notice: Under 35 U.S.C. 154(b), the term of this patent shall be extended for 0 days.

(21) Appl. No.: 08/367,913

(22) Filed: Jan. 3, 1995

Related U.S. Application Data

(63) Continuation of application No. 08/065,700, filed on May 21, 1993, now abandoned, which is a continuation of application No. 07/799,452, filed on Nov. 26, 1991, now abandoned, which is a division of application No. 07/521,814, filed on May 10, 1990, now Pat. No. 5,093,427.

(51) Int. Cl.[7] .............................. C08F 12/20; C08F 14/18; C08F 214/18
(52) U.S. Cl. ......................... 526/249; 526/253; 526/254; 526/255
(58) Field of Search ............... 526/87, 206, 249, 526/253, 254, 255; 525/276

(56) References Cited

U.S. PATENT DOCUMENTS

| | | |
|---|---|---|
| 3,624,064 | 11/1971 | Toyoda et al. . |
| 3,732,184 | 5/1973 | Lindemann et al. . |
| 4,076,929 | 2/1978 | Dohany . |
| 4,569,978 | 2/1986 | Barber . |
| 4,851,479 | 7/1989 | Blaise et al. . |

FOREIGN PATENT DOCUMENTS

| | | |
|---|---|---|
| 280591 | 8/1988 | (EP) . |

OTHER PUBLICATIONS

Tournut et al., "Some Aspects of Thermoplastic Copolymers of Vinylidene Fluoride" (Abstract #21) (1988).

Tournut et al., "Some Aspects of Thermoplastic Copolymers of Vinylidene Fluoride" (Poster).

*Primary Examiner*—David W. Wu
(74) *Attorney, Agent, or Firm*—Seidel Gonda Lavorgna & Monaco, PC

(57) ABSTRACT

Melt processable copolymers of vinylidene fluoride and hexafluoropropylene, containing from about 1% to about 20% hexafluoropropylene by weight, are prepared by emulsion polymerization of vinylidene fluoride and hexafluoropropylene in a stirred aqueous reaction medium. The reaction medium is formed by charging to a heated reactor, water, vinylidene fluoride, an initiator to start the polymerization, and a water-soluble surfactant capable of emulsifying both the initiator and the reaction mass during polymerization. Additional amounts of vinylidene fluoride and initiator are fed to the reaction medium to continue polymerization of the vinylidene fluoride monomer until from about 50% to about 90% of the total weight of the vinylidene fluoride monomer utilized in the process has been added to the reaction medium. There is then added to the reaction medium (i) from about 1% to about 20% hexafluoropropylene by weight, based upon the combined weight of the hexafluoropropylene and the total weight of the vinylidene fluoride utilized in the process, and (ii) the balance of the vinylidene fluoride utilized in the process. The resulting vinylidene fluoride/hexafluoropropylene copolymers are characterized by improved mechanical properties and a DSC melting point typically in the range of from about 160° C. to about 170° C., preferably from about 163° C. to about 168° C.

10 Claims, No Drawings

COPOLYMERS OF VINYLIDENE FLUORIDE AND HEXAFLUOROPROPYLENE AND PROCESS FOR PREPARING THE SAME

This is a continuation of application Ser. No. 08/065,700, filed May 21, 1993, now abandoned which is a continuation of application Ser. No. 07/799,452, filed Nov. 26, 1991, now abandoned, which is a divisional of application of application Ser. No. 07/521,814, filed May 10, 1990, now U.S. Pat. No. 5,093,427.

FIELD OF THE INVENTION

The invention relates to the preparation of vinylidene fluoride polymers, more particularly to the preparation of copolymers of vinylidene fluoride and hexafluoropropylene having improved physical properties.

Abbreviations:

The following materials are referred to in the herein specification by their common abbreviations:

| | |
|---|---|
| DSC | differential scanning calorimetry |
| DTBP | di(tert-butyl)peroxide |
| HFP | hexafluoropropylene |
| IPP | diisopropyl peroxydicarbonate |
| TCFM | trichlorofluoromethane |
| VDF | vinylidene fluoride |
| PVDF | polyvinylidene fluoride |

BACKGROUND OF THE INVENTION

U.S. Pat. Nos. 4,076,929 and 4,569,978 describe an improved emulsion polymerization process for preparing VDF homopolymers and copolymers having improved flexibility. According to the aforesaid process, a comonomer for VDF is added in an emulsion polymerization mixture as part of an initial charge, or the comonomer is introduced continuously in a fixed ratio with respect to VDF. The comonomer may comprise HFP. The invention of U.S. Pat. No. 4,076,929 results in extrusion grade polymer resins having improved melt flow characteristics which may be utilized for the fabrication of objects having greater flexibility and impact resistance. These improvements are diminished as the melt viscosity of the polymer is decreased to 20 kilopoise or lower, measured at 232° C. and 100 sec$^{-1}$ (ASTM 3835), unless increasing amounts of HFP comonomer are utilized. However, as the amount of HFP in the polymer is increased, the DSC melting point, and thus the use temperature of the polymer, decreases.

What is needed is a VDF/HFP copolymer having improved physical properties, particularly improved melt flow, which improved properties are obtained without significant reduction in polymer use temperature, as compared to the use temperature of VDF homopolymer. More particularly, there is a need for a VDF-based polymer which has improved melt flow, but which substantially maintains the melting point of VDF homopolymer.

SUMMARY OF THE INVENTION

A process is provided for the production of VDF/HFP copolymer by the emulsion polymerization of VDF and HFP in a stirred aqueous reaction medium. The aqueous reaction medium is formed by charging the following to a reactor: water, VDF, an initiator to start the polymerization, and a water-soluble surfactant capable of emulsifying both the initiator and the reaction mass during polymerization. Additional amounts of VDF and initiator are fed to the reaction medium to continue polymerization of the VDF until from about 50% to about 90% of the total weight of the VDF utilized in the emulsion polymerization process has been added to the reaction medium. There is then added to the reaction medium (i) from about 1% to about 20% HFP by weight, based upon the combined weight of the HFP and the total weight of VDF added to the reaction medium in the emulsion polymerization process, and (ii) the balance of the VDF utilized in the process. VDF/HFP copolymer is then obtained from the reaction medium. The HFP is preferably added to the reaction medium as rapidly as possible. The balance of the VDF monomer is preferably added to the reaction medium at the same or substantially the same rate as added during the VDF homopolymerization phase of the process.

Preferably, from about 65% to about 85%, most preferably from about 70% to about 80%, of the total weight of VDF utilized in the process is added to the reaction medium before the addition of any HFP. From about 5% to about 15% HFP by weight is preferably added to the reaction medium, based upon the combined weight of the HFP and the total weight of VDF added to the reaction mixture during the polymerization process. The aqueous reaction medium for polymerizing the VDF monomer preferably contains a chain transfer agent, e.g. TCFM, for controlling the molecular weight of the resulting polymer.

According to one embodiment of the invention, VDF is added to the reaction mixture, prior to the addition of HFP, as an initial VDF charge sufficient to obtain an operating pressure in the reactor of at least about 450 PSIG, preferably, from about 450 to about 700 PSIG, after which initiator is added in an amount equal to from about 0.25 to about 2.0 grams per kilogram of VDF present in the initial charge. VDF is additionally added to the reaction medium as a continuous or incremental VDF charge to increase the amount of VDF added to the reaction medium to from about 50% to about 90% of the total amount of VDF utilized in the polymerization process. Additional initiator is added to the reaction medium to continue polymerization of the VDF.

Establishment of the reaction medium prior to addition of the initial VDF charge may comprise the steps of initially charging the reactor with a reaction medium comprising water, fluorosurfactant, and paraffin wax; agitating and heating the mixture; ceasing agitation and venting the reaction medium; resuming agitation and adjusting the temperature to an operating polymerization temperature of from about 65° C. to about 150° C.; and optionally adding chain transfer agent in an amount sufficient to obtain the desired molecular weight of polymer.

The invention further relates to VDF/HFP copolymers such as those prepared according to the present invention, having a HFP content of from about 1% to about 20% by weight, preferably from about 1% to about 15%, most preferably from about 5% to about 15%, and a melting point in the range of from about 160° C. to about 170° C., preferably from about 163° C. to about 168° C.

By "VDF/HFP copolymer" or "vinylidene fluoride-hexafluoropropylene copolymer" is meant normally solid polymers containing at least 50 mole percent vinylidene fluoride copolymerized with hexafluoropropylene as a comonomer, and optionally containing one or more further comonomers selected from the group consisting of tetrafluoroethylene, trifluoroethylene, chlorotrifluoroethylene, vinylfluoride, pentafluoropropene, and any other monomer that will readily copolymerize with vinylidene fluoride. Most preferably, said further comonomer(s) is/are selected from those monomers which are at least as reactive toward polymerization as vinylidene fluoride, e.g. pentafluoropropene, chlorotrifluoroethylene, and trifluoroethylene.

DETAILED DESCRIPTION OF THE INVENTION

According to the present invention, VDF/HFP copolymers are prepared which have improved properties. Prior art methods for copolymer preparation by emulsion polymerization wherein all of the HFP monomer is combined with VDF monomer in an initial reaction mixture charge, or introduced continuously in a fixed feed ratio with VDF, generally result in the formation of uniformly random VDF/HFP copolymers. In contrast, VDF/HFP copolymers of the present invention, produced by homopolymerizing VDF monomer, followed by further VDF polymerization with HFP, results in a polymer having discrete VDF homopolymer domains, and a discrete VDF/HFP copolymer domain. Such polymers possess improved properties over the uniformly random VDF/HFP copolymers. Specifically, they display greater melt flow, lower flexural modulus, improved impact resistance, and/or improved chemical resistance, but without sacrifice to the use temperature of the polymer. The aforementioned improvements may be realized in the production of resins according to the practice of the invention useful for various applications within the present spectrum of commercial PVDF-based polymer usage. In particular, the polymers of the invention provide low melt viscosity resins which display excellent flow characteristics under minimal sheer stress, while nevertheless maintaining the integrity of favorable mechanical properties.

While conventional VDF/HFP copolymers display melt temperatures below about 150° C., generally 140°–145° C., the copolymers of the invention are generally characterized by a melting point, as determined by DSC, in the range of about 160° C. to about 170° C., more particularly from about 163° C. to about 168° C., which closely approaches the melting point of VDF homopolymer generally (168°–170° C.). While certain high viscosity polymers prepared according to the present invention may be characterized by a melting point somewhat below 160° C., it is noted that the melting point nonetheless approximates the melting point of VDF homopolymers formed using substantially the same initiator and operating temperature.

According to the process of the invention, a pressurized polymerizer reactor equipped with a stirrer and heat control means is charged with deionized water, a conventional water-soluble surfactant, preferably a water-soluble fluorosurfactant, and optionally a hydrocarbon wax or oil to coat the metal surfaces of the reactor vessel to minimize adhesion polymerization. The use of a horizontal polymerizer reactor is preferred since it has less tendency to cause agitation-induced coagulation during polymerization.

Water-soluble fluorosurfactants which may be utilized include, for example, those described in U.S. Pat. No. 2,559,752, e.g. acids of the formula $X(CF_2)_nCOOH$ wherein n is an integer from 6 to 20, X is hydrogen or fluorine, and the alkali metal, ammonium amine, and quaternary ammonium salts of the aforesaid acids; phosphoric acid esters of polyfluoroalkanols, of the formula $X(CF_2)_nCH_2OPO\text{-}(OM)_2$ where X is hydrogen or fluorine, n is an integer from 5 to 10, and M is hydrogen, alkali metal, ammonium, substituted ammonium (e.g., alkylamine of 1 to 4 carbon atoms) or quaternary ammonium; sulfuric acid esters of polyfluoroalkanols, of the formula $X(CF_2)_nCH_2OSO_3M$ where X and M are as above; the acids described in U.S. Pat. No. 3,232,970 of the formula $CF_2ClC(CF_3)F(CF_2)_nCOOH$ where n is an integer of 3 to 9, and the metal salts, ammonium salts, and acyl halides of said acid; the acids and salts thereof described in U.S. Pat. No. 3,311,566 and mixtures thereof of the formula $ZC_nF_{2n}COOM$ where Z is fluorine or chlorine, n is an integer of 6 to 13, and M is hydrogen, alkali metal, ammonium, or lower alkyl substituted ammonium. The foregoing surfactants are meant to be illustrative of and not exclusive of fluoroalkyl surfactants, many others of which are known in the art and are operable as dispersion stabilizers in the emulsion polymerization of vinylidene fluoride polymers. The preferred fluorosurfactants comprise ammonium salts of perfluorocarboxylic acids having from 8 to 12 carbon atoms.

In the initial reactor charge, the concentration of the fluorosurfactant is from about 0.05 to about 0.5 wt. % (based on the total weight of the monomers utilized in the polymerization process, i.e., the combined weight of VDF and HFP added to the reaction medium), the preferred concentration being from about 0.1 to about 1.5 wt. %.

The concentration of the paraffin wax may vary over a wide range, according to the interior surface area of the reactor vessel. Generally, the wax concentration may vary from about 5 to about 20 mg per square inch of inside surface area of the reactor vessel. Most preferably, the amount is 10 mg/in$^2$. The function of the wax is to prevent polymer adhesions to the reactor vessel. The wax is conventional. Any long chain saturated hydrocarbon wax or oil may be used.

A chain transfer agent is optionally employed to regulate the molecular weight, and therefore the melt viscosity, of the polymer product. The amount of chain transfer agent used, regardless of when it is added during the process, is a function of the desired melt viscosity and molecular weight distribution of the reaction product. All or part of the optional chain transfer agent may be added to the initial charge. Generally, where a polymer having a low melt viscosity and narrow molecular weight distribution is desired, such as in rotomolding applications, larger amounts of chain transfer agent are utilized. Representative chain transfer agents include various alcohols and ketones, such as acetone, t-butanol and isopropyl alcohol (IPA). See, for example, U.S. Pat. Nos. 3,857,827 and 4,360,652, disclosing polymerization of VDF using acetone and IPA, respectively, as chain transfer agents.

The polymerization may be initiated utilizing any of the various initiators, which typically comprise organic peroxy compounds, useful for the polymerization of vinylidene fluoride. Two classes of peroxy compounds particularly useful as polymerization initiators comprise the organic peroxides, e.g., di(tert-butyl) peroxide ("DTBP") and the dialkyl peroxydicarbonates, most particularly the dialkyl peroxydicarbonates wherein the alkyl groups comprise straight or branched carbon chains containing from 1 to 8 carbon atoms. The latter category includes, for example, di(n-propyl) peroxydicarbonate, di(sec-butyl) peroxydicarbonate, di(ethylhexyl) peroxydicarbonate and diisopropyl peroxydicarbonate ("IPP").

Where IPP is employed as the polymerization initiator, the use of acetone or IPA as the chain transfer agent may lead to development of voids of 15% or greater in the polymer resin if exposed to temperatures greater than 550° F. Thus, where IPP is utilized as the initiator, the preferred chain transfer agent is TCFM. As set forth in U.S. Pat. No. 4,569,978 at column 3, lines 41–54, TCFM provides advantages with respect to lowering initiator consumption, reducing polymer voids, and decreasing the discoloration of the resulting polymer. TCFM may be utilized in varying concentrations to produce products with a wide range of molecular weights without varying the initiator concentration. Generally, the amount of TCFM utilized may vary from about 0.5 to about 5.0 wt. %, more preferably from about 1.5 to about 4.0 wt. %, based upon the total amount of monomers added to the reaction medium during the process. TCFM is particularly preferred as the chain transfer agent where preparation of polymers having a melt viscosity of less than about 15 kilopoise is desired.

After the polymerizer reactor has been charged with water, surfactant, wax and optionally, chain transfer agent, and before the introduction of monomer, the reactor is subjected to a series of evacuations and nitrogen purges to insure an oxygen-free environment for the polymerization. Optionally, before introduction of the monomer, the reactor may be deaerated with a "boil-out" procedure during which the aqueous charge in the reactor is heated to 100° C. while agitating. Once the aqueous charge is boiling, the agitation is stopped and the steam and air are vented off. After about 1 to 10 minutes, typically 2 to 3 minutes, the reactor is sealed and agitation continued. Both methods are essentially equivalent and important for the successful start of the polymerization reaction.

The system is sealed and brought to the desired reaction temperature, i.e. from about 65° C. to about 150° C., preferably from about 65° C. to about 105° C., most preferably from about 75° C. to about 90C. The desired reaction temperature depends, in part, on the nature of the polymerization initiator employed. For IPP, the preferred initiator, the reaction temperature is preferably from about 65° C. to about 105° C. For DTBP, the reaction temperature may be permitted to reach about 150°, preferably no higher than about 135° C. Sufficient VDF is charged to obtain the desired operating pressure. The operating pressure may vary within broad limits. Preferably the pressure is from, for example, about 450 to about 850 psig, preferably from about 550 to about 650 psig. The VDF requirement for the initial VDF charge varies directly with the operating pressure and inversely with the operating temperature.

In the next step, to begin homopolymerization of VDF, an initial charge of polymerization initiator is added. The preferred polymerization initiator is IPP. DTBP, among other initiators, is also useful. In the polymerization induction period, IPP is added in an amount sufficient to achieve a concentration of from about 0.25 to about 2.0 grams IPP per kilogram of VDF monomer present in the initial reactor charge. Most preferably, the initial concentration of IPP is from about 0.5 to about 1.5 grams per kilogram of the VDF monomer in the initial reactor charge.

When the initial charge does not contain chain transfer agent, the addition of VDF monomer should be followed by the addition of chain transfer agent until the ratio of chain transfer agent to monomer to be maintained throughout the reaction is reached. The chain transfer agent may be added in its entirety to the initial charge, or added in its entirety after the initial charge, or may be added to both the initial charge and after the initial charge.

Following the polymerization induction period, VDF monomer, polymerization initiator, and optional chain transfer agent, are fed continuously or incrementally in a constant ratio and at a rate which provides an essentially constant pressure within the polymerizer. The initiator concentration generally controls the rate of polymerization. Therefore, as the polymerization of VDF proceeds, the amount of initiator added is dependent on the rate of reaction which is desired. Economically it is desirable to run the polymerization reaction as fast as possible, with the limiting factor being the capacity of the polymerizer cooling jacket to remove the heat of polymerization from the reaction vessel. The feed rate of initiator is advantageously adjusted to maintain the desired VDF polymerization rate, e.g. a rate of from about 1000 to about 1100 pounds per hour, commercial scale.

The homopolymerization of VDF proceeds until about 50–90%, preferably about 65–85%, most preferably about 70–80%, by weight of the VDF utilized in the emulsion polymerization process has been added to the reaction mixture. At this point, HFP monomer is added to the polymerization mixture in an amount of from about 1% to about 20% by weight, based upon the combined weight of the HFP and the total weight VDF monomer added to the reaction medium in the polymerization process. Below 1% HFP, the resulting polymer essentially has the properties of VDF homopolymer. Above 15% HFP, the polymer begins to take on the properties of a fluoroelastomer, which properties become pronounced above about 20% HFP. Since fluoroelastomers are generally not melt processable, it is preferred to limit the HFP content of the present VDF/HFP copolymers to not more than about 20%, most preferably not more than about 15%. Since HFP reacts more slowly than VDF, it is preferred that substantially the entire amount of HFP is added to the reaction medium as quickly as possible at the appropriate time to maximize the opportunity for the HFP monomer to react. The VDF feed is preferably continued during the HFP feed period, preferably at the same or substantially the same rate as before the addition of HFP.

If the HFP is added to the reaction medium before at least about 50% of the VDF has been added, the melting point of the resulting VDF/HFP copolymer will be depressed. If more than about 90% of the VDF utilized in the process is added to the reaction medium before the HFP is added, sufficient HFP might not be incorporated into the polymer to obtain significant improvement in the physical properties of the polymer over the properties of PVDF homopolymer.

The rate of HFP addition which should be employed is a function of the timing of the HFP introduction. Where HFP is added to the reaction medium late in the polymerization process, e.g., following addition of 90% of the total weight of VDF utilized in the process, fairly rapid addition of the HFP is required to ensure that it has adequate opportunity to react. Where the HFP is introduced early in the polymerization process, e.g., after only 50% of the total VDF weight has been added to the reaction medium, a somewhat slower rate of HFP may be utilized. Regardless of the timing of the addition, HFP should be introduced substantially completely over a small interval of time in comparison with the interval of VDF addition, and not progressively with the VDF feed.

When all the VDF has been introduced, all feeds are discontinued and the batch is allowed to react-out for 30 minutes. Generally, when the pressure has dropped to 150–200 psig, no further reaction takes place. At this time, the agitation is also stopped and the residual monomer(s) are vented through a valve mounted over the vapor space of the reactor to a gas holder for subsequent recycling.

Upon completion of the polymerization, the product is recovered as a latex which may be optionally concentrated by creaming or flash evaporation, or the latex may be coagulated and the polymer recovered as a powder. The latex consists of a stable mixture of the reaction components, i.e., water, surfactant, initiator or initiator decomposition products, chain transfer agent, etc., along with polymer resin particles whose inherent size ranges from between about 0.2 to about 0.3 microns. The polymer resin particles may be isolated by a variety of methods known to those skilled in the art, such as, for example, acid coagulation, freeze coagulation, addition of salting agents, or mechanical shear resulting in the formation of particle flocks. The resin is then recovered from the coagulated material by washing and drying.

The resulting copolymer has an HFP content, of from about 1% to about 20%, preferably from about 1% to about 15%, most preferably from about 5% to about 15% by weight.

The practice of the invention is illustrated in the following non-limiting examples. All examples were carried out at 80-gallon scale, except Example 4, which was carried out at 2-gallon scale. The Example titles include the relative proportions of VDF and HFP monomers fed to the reaction medium in the polymerization process. The HFP content of the resulting polymers is generally about 74% to about 83% of the HFP feed, as a portion of the HFP fed to the reactor typically does not enter into the polymerization reaction. Thus, in Example 1 for instance, while the monomer feed comprised 10 wt. % HFP, the HFP content of the resulting polymer was only about 8 wt. %, reflecting a 20% non-utilization of HFP monomer.

COMPARATIVE EXAMPLE 1

88/12 VDF/HFP Low Viscosity Polymer (2.3 kilopoise)

The following comparative example is based upon Example 15 of U.S. Pat. No. 4,569,978 except that the melt viscosity was reduced from 22.1 kilopoise to 2.3 kilopoise by decreasing the amount of chain transfer agent (TCFM) to 6 lbs., which was all added in the initial charge, rather than continuously.

Into an 80-gallon stainless steel autoclave, 454 pounds (55 gallons) of deionized water, 100 grams of ammonium perfluorodecanoate (surfactant), and 12 grams of a paraffin wax were charged. The reactor was closed, evacuated and heated to 90° C. with agitation (23 rpm, corresponding to 113 surface feet per minute). The following were pumped into the reactor to obtain the desired operating pressure of 550 psig: 18.5 pounds VDF monomer; 2.5 pounds HFP monomer; 6 pounds TCFM. When operating conditions stabilized, the polymerization was begun by introducing approximately 1 pound of IPP initiator. The initiator was added as an emulsion consisting of 1 wt. % IPP in deionized water containing 0.15 wt. % ammonium perfluorodecanoate. The rate of addition of the IPP emulsion was adjusted to obtain and maintain a polymerization rate of 60 pounds/hour of combined VDF and HFP monomers, which were fed throughout the reaction in a fixed 88/12 weight percent ratio. In approximately 3 hours, 176 pounds of VDF and 24 of pounds HFP had been added to the reaction, and all feeds were stopped. The batch was allowed to react-out at a constant temperature of 90° C. to consume residual monomers at decreasing pressure. After about 30 minutes, the agitation was stopped and the reactor was vented, and the latex recovered. Polymer resin was isolated by coagulating the latex, washing the latex with deionized water, and drying. The resin comprised a random copolymer having a melt viscosity of 2.3 kilopoise measured at 232° C. and 100 sec$^{-1}$ (ASTM D3835), and a DSC melting point of 140–145° C.

Example 1

90/10 VDF/HFP Low Viscosity Polymer (1.4 kilopoise )

Into an 80-gallon stainless steel reactor was charged, as in the manner of Comparative Example 1, 454 pounds of deionized water, 100 grams ammonium perfluorodecanoate and 12 grams of paraffin wax. Following evacuation, agitation was begun and the reactor was heated to 90° C., as in Comparative Example 1. During heat up of the ingredients, VDF monomer (approximately 20 pounds) and TCFM (6.5 pounds) were added. Upon stabilization of the temperature and operating pressure, 1 pound of IPP in the form of an emulsion consisting of 1 wt. % IPP in deionized water containing 0.15 wt. % ammonium perfluorodecanoate was added to begin the polymerization. The rate of further addition of the IPP emulsion was adjusted to obtain and maintain a VDF polymerization rate of 60 pounds per hour. The VDF homopolymerization reaction was continued until approximately 135 pounds (representing 75 wt. % of the total VDF monomer utilized in the herein example) was introduced into the reaction mass. Thereafter, 20 pounds of HFP (comprising 10 wt. % of the total weight of combined VDF and HFP monomers utilized in the herein example) was pumped into the reactor at a rate of approximately 100 pounds per hour, while the VDF feed was continued. The sudden influx of the relatively slow reacting HFP monomer temporarily suppressed the reaction rate. The initiator addition rate was increased to restore the polymerization rate back to 60 pounds per hour. The reaction continued until a total of 180 pounds of VDF had been added to the reaction mass. The react-out cycle and resin recovery process was repeated as in Comparative Example 1.

The resulting resin displayed a melt viscosity of 1.4 kilopoise, measured at 232° C. and 100 sec$^{-1}$ (ASTM D3835), and a DSC melting point of 163–168° C.

Example 2

90/10 VDF/HFP Hiqh Viscosity Copolymer (15.4 kilopoise)

The procedure of Example 1 was repeated except that the amount of TCFM was reduced from 6.5 pounds to 3.2 pounds in order to produce a copolymer of higher melt viscosity, suitable for extrusion applications. The amount of IPP in the initial charge was reduced to 0.05 wt. % based upon the weight of VDF monomer present in the initial charge, and then IPP was fed at a rate sufficient to maintain a polymerization rate of 60 pounds per hour. The resulting copolymer displayed a melt viscosity of 15.4 kilopoise, measured at 232° C. and 100 sec$^{-1}$ (ASTM D3835), and a DSC melting point of 163°–168° C. The material, suitable for extrusion applications, was characterized by a break elongation of about 350–450%, as measured by ASTM D882. In contrast, VDF homopolymer is characterized by a break elongation of only about 50–250%.

Example 3

95/5 VDF/HFP Medium Viscosity Copolymer (8–10 kilopoise)

The procedure of Example 1 was repeated except that the amount of TCFM added to the reaction medium was 4.4 pounds (2.2 wt. %, based upon the weight of the combined monomers) to yield a product having a melt viscosity intermediate between the melt viscosities of the products of Examples 1 and 2, suitable for injection molding. Furthermore, the level of HFP added to the reaction medium was reduced to 5 wt. % of the combined monomers. The polymer product displayed a melt viscosity of 8–10 kilopoise at 232° C. and 100 sec$^{-1}$ (ASTM D3835), and a DSC melting point of 163–168° C.

Example 4

95/5 VDF/HFP High Viscosity Copolymer (29–33 kilopoise)

Into a 2-gallon reactor were charged 5145 g (11.33 lbs.) of deionized water, 2.3 g ammonium perfluorodecanoate, and 4 g of paraffin wax. Following evacuation, agitation was begun and the reactor was heated to 125° C. During heat-up of the ingredients, 9 ozs. of VDF monomer were added. Upon stabilization of the temperature and operating pressure, approximately 4 g DTBP initiator were added to begin the polymerization. The foregoing amounts of VDF and DTBP represent 1 weight fraction and 2 weight fractions, respectively, of the total amounts of these reactants utilized in this Example. Subsequent additions of the DTBP initiator were maintained at the same ratio until all the DTBP had been introduced. At the point at which all of the DTBP was added, 50% of the VDF had been introduced. The VDF addition was continued until approximately 60 ozs. (representing 75% of the total mount of VDF utilizing in this Example) were introduced to the reactor. At that point, 0.25 lb. of HFP (comprising 5 wt. % of the total weight of combined VDF and HFP monomers used herein) was pumped into the reactor at a rate of 2.5 pounds per hour, while the VDF feed was continued. The react-out cycle and resin recovery process was repeated as in Comparative Example 1. The resulting polymer was characterized by a melt viscosity of 29–33 kilopoise at 232° C. and 100 sec$^{-1}$ (ASTM D3835), and a DSC melting point of 152–156° C.

It should be noted that the polymerization initiator utilized in Example 4, DTBP, is relatively slow-reacting compared to the IPP initiator of Examples 1–3. The half-life of DTBP is 10 hours at 125° C. In contrast, the half-life of IPP at 75° C. is only 15 minutes. Accordingly, it is necessary to add DTBP in larger quantities (5.5–7.5 g/kg of monomer), and at a faster rate in comparison to IPP, in order to provide a sufficient number of initiator sites to achieve an overall polymerization rate of 1.5 lbs. per hour, which corresponds to 1000–1500 lbs. per hour at commercial scale.

The physical properties of representative batches of the Comparative Example 1 and Examples 1–3 materials are set forth in Table 1, below. Two batches each of the Comparative Example 1 and Example 1 materials were tested. The values of some measured parameters, e.g. melt viscosity, typically vary slightly from batch to batch with slight variations in the HFP content, amount of chain transfer agent, and the like.

The properties of the Example 2 VDF/HFP copolymer are compared to the properties of the commercially available VDF homopolymer having a similar melt viscosity (KYNAR® 730, Atochem North America, Inc.). Likewise, the properties of the Example 3 VDF/HFP copolymer are compared to the properties of a commercially available VDF homopolymer having a similar melt viscosity (KYNAR® 720, Atochem North America, Inc.). The following ASTM test procedures were employed:

| | |
|---|---|
| Specific Gravity | ASTM D792 |
| Tensile Strength (yield) | ASTM D882 |
| Tensile Strength (break) | ASTM D882 |
| % Elongation (break) | ASTM D882 |
| Flexural Modulus | ASTM D790 |
| $T_m$ (DSC) | ASTM D3418 |
| $T_c$ (DS) | ASTM D3418 |
| Melt Viscosity | ASTM D3835 |

TABLE 1

| | Compar. Ex. 1 | | Example 1 | | | | | |
|---|---|---|---|---|---|---|---|---|
| | Batch A | Batch B | Batch A | Batch B | Example 2 | PVDF$^2$ | Example 3 | PVDF$^3$ |
| Specific gravity | (1.77–1.79) | | (1.77–1.79) | | 1.77–1.79 | 1.77–1.79 | 1.77–1.79 | 1.77–1.79 |
| Tensile Strength (yield) psi | 3120 | 3565 | 4453 | 4345 | 3957 | 5000–7000 | 5710 | 5000–7000 |
| Tensile Strength (break) psi | 4255 | 3100 | 2229 | 2141 | 5390 | 4000–6200 | 3685 | 4200–7000 |
| % Elongation (break) | 600 | 392 | 218 | 320 | 472 | 50–250 | 393 | 50–250 |
| Flexural Modulus, Kpsi | 89 | 105 | 141 | 105 | 107 | 180–300 | 158 | 200–325 |
| Dart impact strength | Ductile | ND | Ductile | ND$^1$ | Ductile | Ductile | Ductile | Slightly brittle |
| $T_m$ ° C. | 144.9 | 144.5 | 166.4 | 166.5 | 164.0 | 165–170 | 169.4 | 165–170 |
| $T_c$ ° C. | 103.0 | 109.7 | 129.2 | 127.4 | 135.9 | 130–135 | 137.0 | 130–135 |
| HFP content, wt. % | 10.8 | 9.80 | 7.40 | 8.30 | 7.80 | 0 | 4.10 | |
| Melt viscosity, kilopoise | 2.90 | 2.60 | 3.70 | 4.0 | 15.0 | 13.5–16.5 | 8.10 | 7.5–10.5 |

ND$^1$ = not done
PVDF$^2$ = KYNAR ® 730
PVDF$^3$ = KYNAR ® 720

The melting temperature ($T_m$) was determined by differential scanning calorimetry during the second temperature scanning cycle. The crystal phase transition temperature ($T_c$) was determined by differential scanning calorimetry during the first temperature scanning cycle. The Dart impact resistance test was conducted by dropping a 35 pound weight having a ½ inch diameter tup from a height of 18 inches onto a 4×4 inch plaque (1/16 inch thickness) of the polymer material clamped in a circular holding device leaving a 3¾ inch area open for impact with the tup.

The properties of the Example 4 VDF/HFP high viscosity copolymer were compared to the properties of a commercially available VDF homopolymer having substantially the same melt viscosity range (KYNAR® 460, Atochem North America, Inc.). Table 2 sets forth the significantly beneficial differences in properties:

TABLE 2

|  | Example 4 | PVDF[1] |
| --- | --- | --- |
| Notched Impact Strength, ft-lbs per inch of notch[2] | 9.4 | 2 to 3 |
| Chemical Stress Crack Resistance, days for 60% failure[3] | >256[4] | 12 to 46 |
| DSC Melt Point, ° C. | 152 to 156 | 155 to 160 |

[1]KYNAR ® 460 (Atochem North America, Inc.
[2]ASTM D256.
[3]Specimens under 20% strain in 10 wt. % NaOH at 90° C.
[4]Only 1 failure - 4 of 5 still intact.

The products of the present invention yield an opaque polymer significantly whiter in color than PVDF resins presently available. Moreover, the products of the invention display significantly greater resistance to selected chemical agents than corresponding uniformly random VDF/HFP copolymers having a similar HFP content.

Rotomolding applications require a resin which exhibits excellent melt flow capability at essentially zero stress. While the desired melt flow may be achieved with very low molecular weight PVDF polymers, the mechanical properties of rotomolded articles prepared from such homopolymers are unacceptable. Elongation and impact resistance, in particular are poor. The present invention provides for rotomolding grade resins, as illustrated by the resin of Example 1, which have excellent mechanical properties without sacrificing maximum use temperature. The uniformly random VDF/HFP 88/22 copolymer of Comparative Example 1, while having excellent flow characteristics (melt viscosity=2.3 kilopoise) is characterized by a DSC melting point of only 140–145° C., making it unsuitable for high temperature applications. The 90/10 VDF/HFP copolymer of Example 1 on the other hand, while having roughly a similar HFP content, possess excellent flow characteristics (melt viscosity=1.4 kilopoise), and retains a maximum use temperature of 163° C.–168° C., which approaches the use temperature of PVDF homopolymer. The Example 1 material, which combines extremely low viscosity with excellent impact strength and a high use temperature, is characteristic of rotomolding VDF/HFP copolymer resins made possible by the practice of the present invention.

Particularly useful for rotomolding applications are VDF/HFP copolymers according to the invention having melt viscosities in the range of from about 1 to about 4 kilopoise, measured at 232° C. and 100 sec$^{-1}$ (ASTM D3835). Such copolymers are also useful for forming powder coating resin compositions having. improved flexibility and crack resistance according to the commonly assigned U.S. patent application Ser. No. 521,792 entitled "Powder Coatings of Vinylidene Fluoride/Hexafluoropropylene Copolymers" of Michael D. Poleck, filed on May 10, 1990, now U.S. Pat. No. 5,177,150. The entire disclosure of the aforementioned commonly assigned patent application is incorporated herein by reference.

In some applications, parts extruded from conventional PVDF resins may become highly stressed due to post-forming operations, such as flange forming on pipe lining ends. In such operations, the part may be stretched to near the break elongation of the extruded resin, which may cause flange failure after extended service. Exposure to certain chemical environments may accelerate the tendency of the article to stress crack. The invention provides for the production of extrusion grade VDF/HFP copolymer resins suitable for forming pipe, pipe lining, and the like. Such extrusion grade resins, as illustrated by Example 2, are characterized by an increased break elongation in comparison to PVDF homopolymer. The increase in break elongation simplifies field flange-forming operations, and provides flanges of greater strength and flexibility than heretofore possible utilizing PVDF resins.

Injection molding applications generally require a resin having a melt viscosity lower than extrusion grade, but higher than rotomolding grade. Fittings prepared by injection molding from conventional PVDF resins can exhibit significant discoloration which is apparent and objectionable when the fittings are fusion welded to lengths of pipe which are much whiter. Processing conditions may be modified to produce fittings which match the color of the pipes, but such parts are inherently brittle. The invention enables the injection molding of VDF/HFP copolymer resins into chemical process industry fittings, which are characterized by physical properties intermediate between rotomolding and extrusion grades. The polymer of Example 3 is illustrative of such an injection molding grade polymer prepared according to the present invention. Fittings formed from injection molding grade resins of the invention are ductile, rather than brittle, and do not suffer from discoloration.

The polymer of Example 4 represents a high viscosity polymer (29–33 kilopoise) prepared without employing a chain transfer agent separate from the polymerization initiator, DTBP. The Example 4 polymer is suitable for extrusion, compression molding and injection molding. It may be appreciated from a consideration of Table 2 that while the melting point range of the high viscosity Example 4 polymer is somewhat lower than 160° C., the range (152–156° C.) nevertheless approximates the melting point range 155–16° C.) of a VDF homopolymer formed using substantially the same initiator and operating temperature.

The particular resin grade desired—rotomolding, injection, or extrusion—may be obtained primarily by manipulating the amount and nature of the chain transfer agent and the amount of HFP added to the reaction medium in the polymerization process. Generally, the utilization of greater amounts of chain transfer agent, particularly TCFM, results in polymers having low molecular weights, and therefore low melt viscosities. Thus, the Example 4 polymer, which was prepared without chain transfer agent, displayed the relatively high melt viscosity of 29–33 kilopoise. The impact resistance and increased break elongation properties are primarily dependent upon the HFP content of the polymer.

The process of the present invention results in VDF/HFP copolymers having a chemical composition distinct from that of random VDF/HFP copolymers, as illustrated by the following comparison.

A 88/12 VDF/HFP random copolymer prepared by incremental addition of HFP to an emulsion polymerization reaction medium containing VDF, resulted in an essentially uniform copolymer with HFP units regularly distributed within the polymer chains. The Example 1 copolymer, prepared by addition of HFP after 75% of the VDF had been fed to the polymerization reaction medium, was characterized by an irregular HFP distribution, as determined by nuclear magnetic resonance analysis of selected solution-fractionation samples.

Solution-fractionation was accomplished by exposing a film of each polymer to refluxing mixtures of acetone/methanol of gradually increasing acetone concentration. Solid polymer fractions were isolated by distillation of the solvent and drying of the residues. Data are shown in Table 3.

TABLE 3

VDF/HFP COPOLYMER FRACTIONATION

| Fraction | Vol. % Acetone | Wt. % Soluble | Cum. Wt. % Soluble |
|---|---|---|---|
| Random Copolymer | | | |
| A | 30 | 0.92 | 0.92 |
| B | 40 | 7.35 | 8.25 |
| C | 50 | 38.25 | 46.5 |
| D | 60 | 58.25 | 100 |
| Example 1 Copolymer | | | |
| A' | 30 | 3.82 | 3.82 |
| B' | 40 | 2.53 | 6.35 |
| C' | 50 | 4.54 | 10.89 |
| D' | 60 | 5.97 | 16.86 |
| E' | 70 | 5.85 | 22.71 |
| F' | 80 | 5.21 | 27.92 |
| G' | 90 | 65.33 | 93.25 |
| H' | 100 | 1.18 | 100 |

The approximate middle fraction (C) and major fraction (D) of the random copolymer, and the approximate middle fraction (D') and major fraction (G') of the Example 1 copolymer were subjected to fluorine-19 nuclear magnetic resonance spectral determination. Data are shown in Table 4.

TABLE 4

| Sample | Fraction % Sol.(1) | Solvent Vol. % Acetone | % HFP(2) Mol. % | % HFP(2) Wt. % | Sequence Distribution HFP-VDF-HFP(3) |
|---|---|---|---|---|---|
| Random Copolymer | | | | | |
| C | 38.3 | 50 | 4.5 | 9.9 | 0.4 |
| D | 58.3 | 60 | 4.2 | 9.3 | 0.3 |
| Example 1 | | | | | |
| D' | 6.0 | 60 | 9.2 | 19.2 | 1.8 |
| G' | 65.3 | 90 | 2.1 | 4.8 | 0.4 |

(1) Fraction of the polymer which dissolved in a mixture of acetone/methanol with the listed acetone content.
(2) Fluorine-19 NMR Spectral Determination
(3) HFP-VDF-HFP sequence =

It may be observed that the HFP unit concentration of the approximate middle acetone/methanol fraction (D') of the Example 1 copolymer is much higher than the HFP unit concentration of the major Example 1 fraction, (G') or the random copolymer fractions (C,D). Similarly, the -HFP-VDF-HFP-sequence distribution in the Example 1 middle fraction (D') is found at a much higher frequency than in the major Example 1 fraction, (G') or in the random copolymer fractions (C,D). It is believed that the irregular distribution of HFD/HFP comonomer, and the irregular occurrence of the -HFP-VDF-HFPsequence, accounts for the unique properties of the copolymers of the invention.

The present invention may be embodied in other specific forms without departing from the spirit or essential attributes thereof and, accordingly, reference should be made to the appended claims, rather than to the foregoing specification, as indicating the scope of the invention.

What is claimed is:

1. A vinylidene fluoride-hexafluoropropylene copolymer comprising one or more discrete vinylidene fluoride-hexafluoropropylene copolymer domains and one or more discrete vinylidene fluoride homopolymer domains including a major vinylidene fluoride homopolymer domain which contains at least about 50% of the vinylidene fluoride content of the copolymer, said copolymer having a hexafluoropropylene content of from about 1% to about 20% by weight of the copolymer.

2. A copolymer according to claim 1 wherein said major vinylidene fluoride homopolymer domain contains at least about 65% of the vinylidene fluoride content of the copolymer.

3. A copolymer according to claim 2 wherein said major vinylidene fluoride homopolymer domain contains at least about 70% of the vinylidene fluoride content of the copolymer.

4. A copolymer according to claim 1 having a melting point in the range of from about 160° C. to about 170° C.

5. A copolymer according to claim 4 having a melting point in the range of from about 163° C. to about 170° C.

6. A copolymer according to claim 1 having a hexafluoropropylene content of from about 1% to about 15% by weight of the copolymer.

7. A copolymer according to claim 6 having a hexafluoropropylene content of from about 5% to about 15% by weight of the copolymer.

8. A copolymer according to claim 2 having a hexafluoropropylene content of from about 5% to about 15% by weight of the copolymer.

9. A copolymer according to claim 3 having a hexafluoropropylene content of from about 5% to about 15% by weight of the copolymer.

10. A copolymer according to claim 1 having a melt viscosity in the range of from about 1 to about 4 kilopoise, measured at 232° C. and 100 sec$^{-1}$.

* * * * *